United States Patent [19]

Pike et al.

[11] Patent Number: 5,306,028
[45] Date of Patent: Apr. 26, 1994

[54] CHANGE CART

[76] Inventors: Russell C. Pike; Dinah D. Pike, both of #5 Lakeview Dr., Kimberling City, Mo. 65686

[21] Appl. No.: 9,966

[22] Filed: Jan. 27, 1993

[51] Int. Cl.$^5$ .............................................. B62B 3/00
[52] U.S. Cl. .............................. 280/47.35; 280/47.31; 280/79.2; 280/755
[58] Field of Search ............... 280/47.35, 47.34, 47.19, 280/79.2, 47.26, 47.24, 47.371, 250.1, 755, 47.315; 220/345

[56] References Cited

U.S. PATENT DOCUMENTS

| | | | |
|---|---|---|---|
| 592,177 | 10/1897 | Statsman | 280/47.26 |
| 2,784,999 | 3/1957 | Hunt | 280/47.35 |
| 3,573,879 | 4/1971 | Bergkamp et al. | 280/47.35 X |
| 3,889,964 | 6/1975 | Pitts, Jr. | 280/250.1 X |
| 3,889,967 | 6/1975 | Sauer | 280/47.35 |
| 4,017,091 | 4/1977 | Wallen | 280/47.315 X |
| 4,118,048 | 10/1978 | Spranger et al. | 280/47.35 |
| 4,597,122 | 7/1986 | Handler et al. | 220/345 X |
| 4,652,062 | 3/1987 | Greenwood | 280/47.35 X |
| 4,811,964 | 3/1989 | Horn | 280/250.1 |
| 4,832,354 | 5/1989 | LaFreniere | 280/47.371 X |
| 4,886,286 | 12/1989 | Whorton, III | 280/47.35 |
| 4,989,291 | 2/1991 | Parent | 280/47.35 X |
| 5,048,849 | 9/1991 | Mathews et al. | 280/47.35 |
| 5,190,302 | 3/1993 | Trotta | 280/47.34 X |

FOREIGN PATENT DOCUMENTS 0918012  2/1963  United Kingdom ............. 280/47.34

Primary Examiner—Margaret A. Focarino
Assistant Examiner—Peter English
Attorney, Agent, or Firm—Allen D. Gutchess, Jr.

[57] ABSTRACT

A change cart for gambling casinos includes a box-like housing mounted on wheels. The housing has an upper compartment accessible from the top for containing rolls of coins and a compartment accessible from the back containing a drawer for dollar bills. A larger, lower compartment is also accessible from the back and contains supplies. The wheels include two large wheels rotatably mounted near the rear of the housing and two casters which are mounted under forward corners of the housing. A push handle extends above the rear of the housing to manipulate the change cart. The push handle can be vertically adjusted to accommodate the particular casino worker. Tubular outriggers extend outwardly below the housing behind the large wheels to prevent tipping of the cart and similar outriggers extend outwardly in front of the large wheels to serve as foot guards. Heavy corner bumpers can also be located at forward corners of the cart.

5 Claims, 2 Drawing Sheets

CHANGE CART

This invention relates to a change cart for gambling casinos.

It is common i gambling casinos for workers to circulate among players with change belts to keep the players supplied with coins, particularly for slot machines and the like. Heretofore, the coins were carried in heavy duty change belts which were of substantial weight when filled with coins. The weight of the change belts frequently caused back and leg pains, particularly when worn for a length of time.

The limited capacity of the change belts required frequent trips to the coin source and reduced the time the worker could spend circulating through the casino to provide coins for the players. It is, of course, the goal to provide ready access to change for the players with gambling time being lost when the proper change is unavailable.

One attempt to overcome these problems is shown in U.S. Pat. No. 5,048,849, issued Sep. 17, 1991. In this patent, a tubular framework mounted on casters carries the change belt and is pushed around by a worker. However, this device had limited capacity by the physical nature of the change belt and lacked secure means for preventing theft of the coins therein. It also had no means for readily receiving and sorting dollar bills from which change was made.

The present invention provides a change cart which includes a housing of a rigid, box-like configuration mounted on wheels. The housing has a compartment accessible from the top for containing rolls of coins, with a sliding panel or door which can be readily locked. The housing also has a compartment accessible from the back containing a drawer for dollar bills prefereably mounted on sliding tracks for better accessibility. This compartment also has a drawer front which can be locked. A larger, lower compartment, also accessible from the back, can contain supplies, such as buckets, etc. The wheels include two large wheels which are rotatably mounted near the rear of the housing and two casters pivotally mounted under forward corners of the housing. This combination of wheels provides easy portability and high maneuverability. A push bar or handle extends above the rear of the housing to manipulate the change cart and is mounted for vertical adjustment to accommodate different heights of workers. Tubular outriggers extend outwardly from the housing behind the large wheels near the floor to prevent tipping of the cart. Two similar outriggers extend outwardly from the housing in front of the large wheels near the floor to serve as foot guards.

The change cart according to the invention provides a a much larger capacity for change, substantially reducing the need for the worker to return the cart to the source of coins for replenishment. More time on the gaming floor thus affords greater accessibility of the players to coins and thereby achieves maximum playing time for them. The change cart also provides high visibility so as to be easily recognized by the players. Health problems and related costs are also significantly reduced by the use of the cart.

It is, therefore, a principal object of the invention to provide a change cart for casinos having the features and advantages discussed above.

Many other objects and advantages of the invention will be apparent from the following detailed description of preferred embodiments thereof, reference being made to the accompanying drawings, in which.

Figure 1:
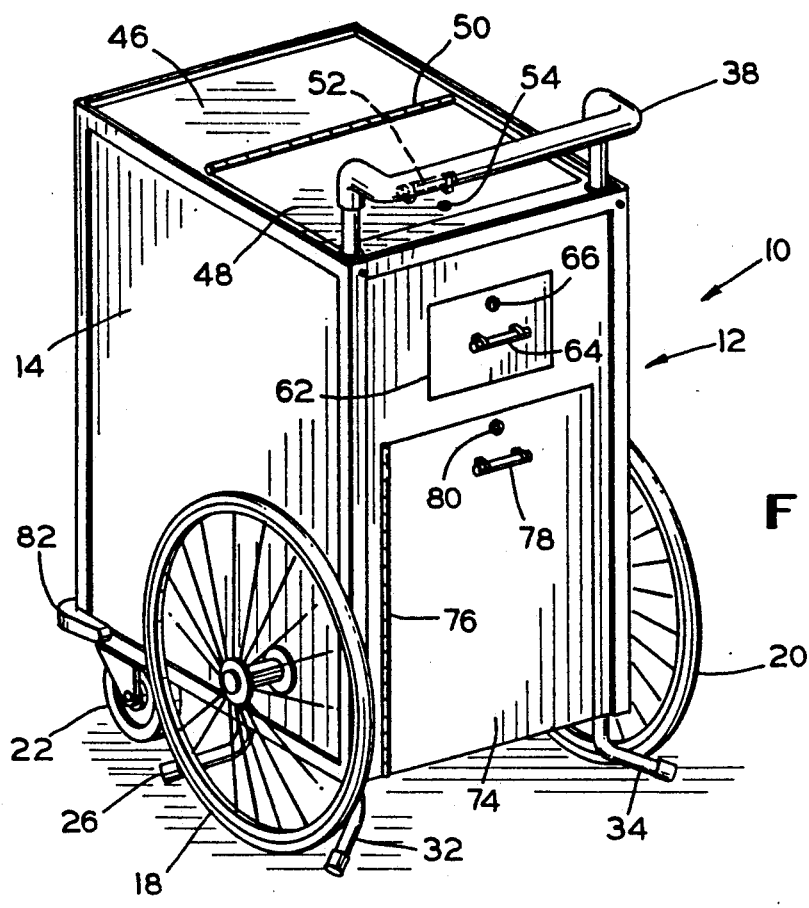
FIG. 1 is a rear view in perspective of a change cart in accordance with the invention.
Figure 2:
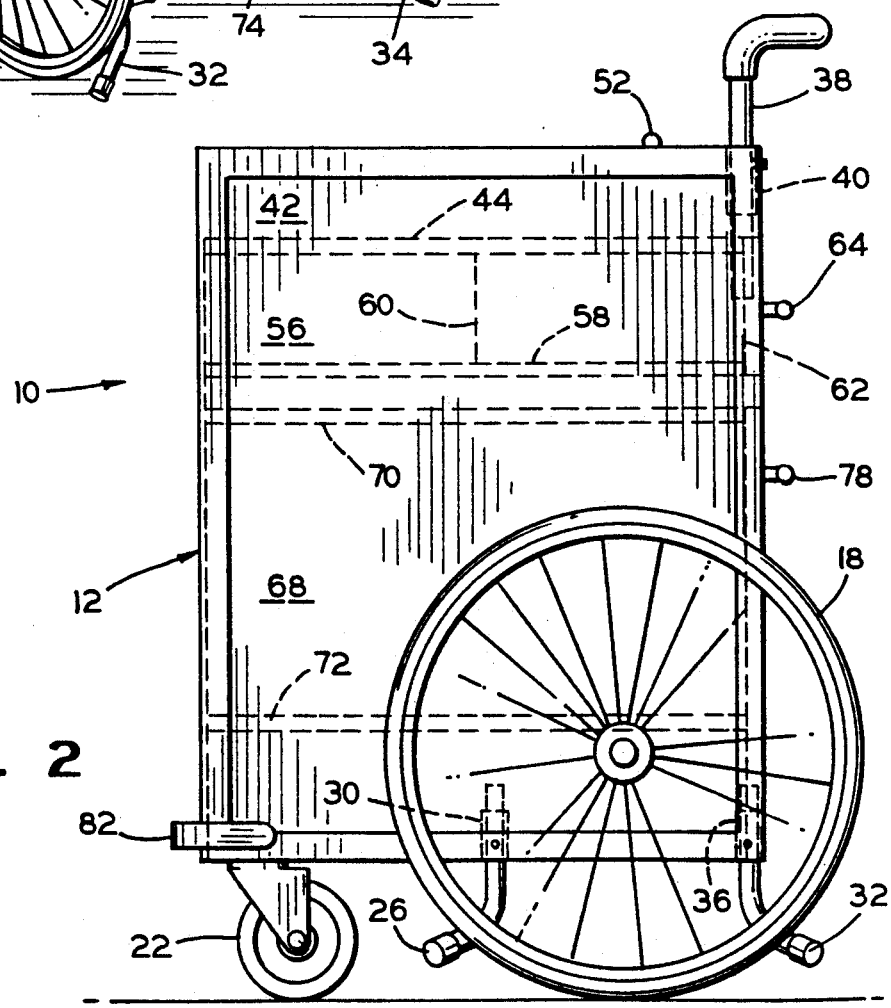
FIG. 2 is a somewhat schematic view in elevation of the change cart of FIG. 1.
Figure 3:
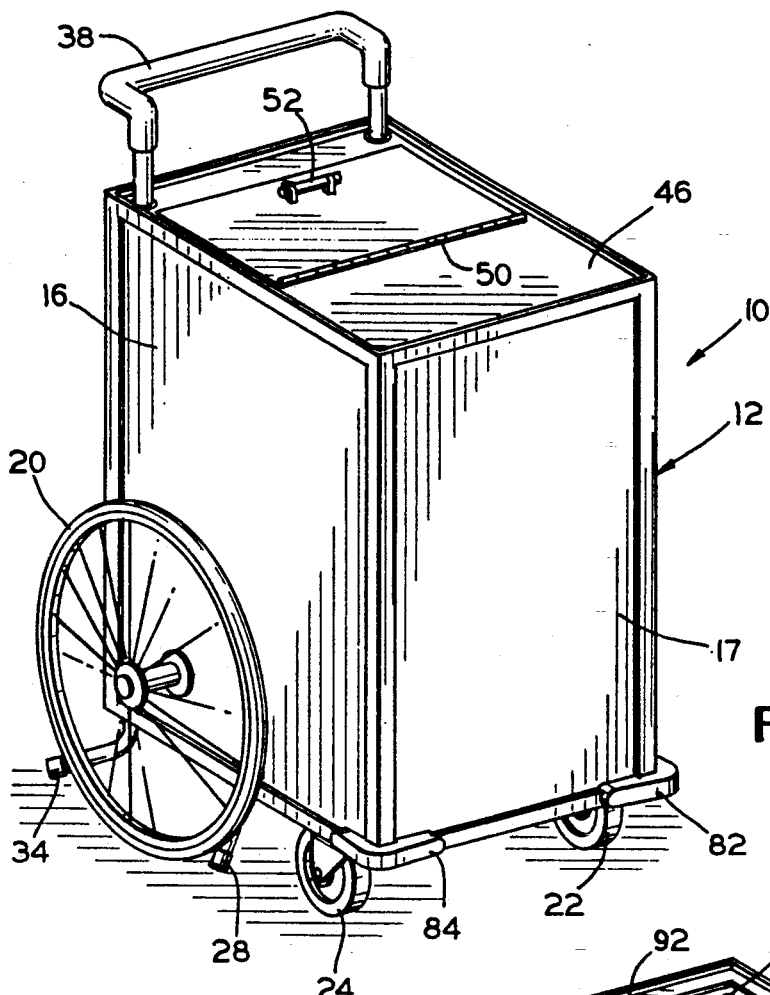
FIG. 3 is a front view in perspective from the opposite corner of the change cart of FIG. 1.

Referring to FIGS. 1-3, a change cart embodying the invention is indicated at 10. The cart has a housing 12 of box-like or generally rectangular parallelepiped configuration. The housing has side panels 14 and 16 and a front panel 17. On the side panels, the casino name and logo can be placed to help achieve high visibility for the cart to players. The panels can be of aluminum covered with plastic sheeting. The housing 12 typically has a length of about twenty-four inches with a width of twenty inches and a height from the floor of about thirty-four inches. This enables the cart to carry sufficient change and still be maneuverable in tight spaces. The need for replenishing the supply of change is considerably less than the change belts heretofore employed by casino workers.

Two large wheels 18 and 20 are rotatably mounted near the rear of the cart 10 and extend upwardly about one-half the height of the housing 12. The cart also has casters 22 and 24 mounted under forward corners of the cart. Forward elongate tubular members or outriggers 26 and 28 extend outwardly under the front of the large wheels 18 and 20 near the floor to serve as foot guards. They can be vertically adjustable in sleeves 30 having setscrews (FIG. 2). Rear elongate tubular members or outriggers 32 and 34 extend under the rear of the large wheels 18 and 20 near the floor. These also serve as foot guards as well as to prevent the possibility of the cart tipping over backwards. These are also vertically adjustable in sleeves 36 having setscrews (FIG. 2).

A push handle 38 extends upwardly above the rear of the cart and can be vertically adjusted by sleeves 40 having suitable setscrews.

The combination of the large wheels 18 and 20 with the casters 22 and 24 and the handle 38 provide a high degree of maneuverability for the cart.

An upper compartment 42 for rolls of coins is formed between a divider 44 and a top 46 of the housing 12. In this instance, the compartment is closed off by a door or panel 48 having a hinge 50, a handle 52, and a lock 54. Preferably, the panel 48 automatically is locked when it is in a closed position, closing off the compartment 42.

A lower compartment 56 for dollar bills is formed between the divider 44 and a divider 58. A drawer 60 is preferably provided for dollar bills and has a drawer panel 62 at the front of the drawer with a handle 64 and a lock 66. The door panel 62 is preferably automatically locked by the lock 66 when the panel is in a closed position closing off the rear of the compartment 56.

A large, lower compartment 68 is preferably located near the bottom of the housing 12. It is formed by an upper divider 70 and a lower divider or bottom 72. It has a large door or panel 74 with a hinge 76, a handle 78, and a lock 80. This is a utility compartment for such items as buckets, etc.

The housing 12 also preferably has large resilient corner bumpers 82 and 84 to protect the cart.

Figure 4:
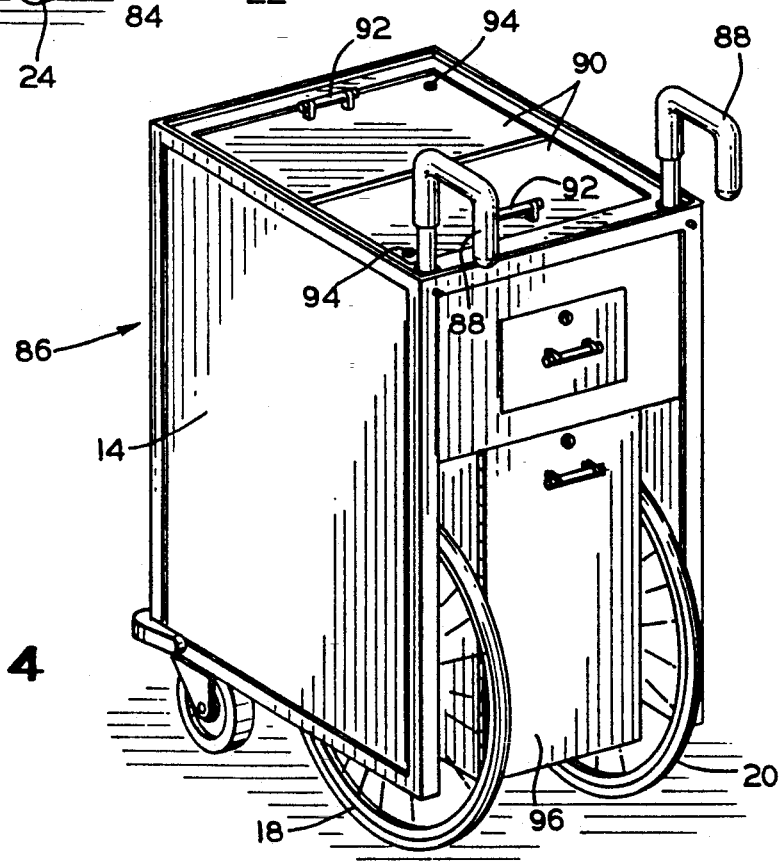
FIG. 4 is a rear view in perspective of a modified change cart embodying the invention.

Referring to FIG. 4, a modified cart 86 embodying the invention is basically similar to the cart 10. However, the cart 86 has the large wheels 18 and 20 rotatably mounted inside the side panels 14 and 16 to provide a lesser overall width for the cart 86 and also to provide a cleaner appearance. Tubes or outriggers can also be employed with this cart if desired. The cart 86 also has separate push handles 88.

At the top of the cart 86, in place of the door panel 48, are two sliding door panels 90 which overlap. Each of the door panels 90 has a handle 92 and a lock 94. The locks 94 automatically lock the panels when in closed positions closing off the upper compartment. The utility compartment of the cart 86 is also narrower with a narrower door 96 between the wheels 18 and 20.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. A change cart for gambling casinos comprising a housing of generally rectangular parallelepiped configuration, said housing having parallel side panels and a front panel, said housing also having a top, a bottom, and a rear, a pair of large wheels rotatably mounted by said side panels near the rear of said housing and extending upwardly approximately half the height of said housing, said large wheels being located inside said side panels, two casters mounted under front corners of said housing where said side panels and said front panel meet, push handle means at the rear of said housing and extending upwardly thereabove, internal sleeves in the rear of said housing to receive lower portions of said push handle means to enable said push handle means to be vertically adjusted, said housing having a first, upper coin compartment accessible from the top thereof, overlapping, horizontally-disposed, slidable panels for closing off and locking said upper compartment, said housing having a second compartment accessible from the rear thereof, a drawer in said second compartment and having a drawer front for locking said drawer in said second compartment when said drawer front is in a closed position, and said housing forming a large utility compartment below said second compartment.

2. A change cart according to claim 1 wherein door means are provided for closing off said utility compartment.

3. A change cart for gambling casinos comprising a housing of generally rectangular parllelepiped configuration, said housing having parallel side panels and a front panel, said housing also having a top, a bottom, and a rear, a pair of large wheels rotatably mounted by said side panels near the rear of said housing and extending upwardly approximately half the height of said housing, two casters mounted under front corners of said housing where said side panels and said front panel meet, push handle means at the rear of said housing and extending upwardly thereabove, means in the rear of said housing to receive lower portions of said push handle means to enable said push handle means to be vertically adjusted, said housing having a first, upper coin compartment accessible from the top thereof, overlapping, horizontally-disposed, slidable panels for closing off and locking said upper compartment, said housing having a second compartment accessible from the rear thereof, a drawer in said second compartment and having a drawer front for locking said drawer in said second compartment when said drawer front is in a closed position, and said housing forming a large utility compartment below said second compartment.

4. A change cart according to claim 3 wherein vertically-adjustable elongate members extend outwardly from said housing in front of said rear wheels to serve as foot guards.

5. A change cart according to claim 3 wherein said housing has vertically adjustable elongate members extending outwardly therefrom at the rear of said rear wheels to serve as foot guards and to inhibit tipping of the cart in the rearward direction.

* * * * *